United States Patent

Pruna

[11] Patent Number: 5,546,647
[45] Date of Patent: Aug. 20, 1996

[54] METHOD OF MAKING AN EJECTOR TUBE FOR MOLDS

[76] Inventor: Alberto N. Pruna, 8, calle Juan Ramón Jiménez, 08960 Sant Just Desvern, Spain

[21] Appl. No.: 343,573

[22] PCT Filed: Mar. 30, 1994

[86] PCT No.: PCT/ES94/00036

§ 371 Date: Nov. 22, 1994

§ 102(e) Date: Nov. 22, 1994

[87] PCT Pub. No.: WO94/22634

PCT Pub. Date: Oct. 13, 1994

[30] Foreign Application Priority Data

Apr. 6, 1993 [ES] Spain ................ P 9300719

[51] Int. Cl.⁶ .................................................. B23P 25/00
[52] U.S. Cl. ........................ 29/527.4; 72/340; 72/352; 72/354.6; 72/359
[58] Field of Search .................. 72/340, 341, 352, 72/354.6, 358, 359, 367; 29/527.4

[56] References Cited

U.S. PATENT DOCUMENTS

| | | | |
|---|---|---|---|
| 126,610 | 5/1872 | Wood | 72/358 |
| 1,198,250 | 9/1916 | Malo | 72/358 |
| 1,483,947 | 2/1924 | Morse | 72/359 |
| 1,566,645 | 12/1925 | Breeze | 72/359 |
| 2,344,285 | 3/1944 | Cormode | 72/359 X |
| 2,377,191 | 5/1945 | Teachout | 72/359 X |
| 2,548,702 | 4/1951 | Chamberlain | 72/358 X |
| 2,965,965 | 12/1960 | Allan | 72/367 X |
| 3,224,243 | 12/1965 | Van Deberg | 72/359 |
| 4,722,216 | 2/1988 | Fencl | 72/367 X |
| 4,928,507 | 5/1990 | Staat et al. | 72/358 X |
| 5,184,495 | 2/1993 | Chunn et al. | 72/359 X |

FOREIGN PATENT DOCUMENTS

| | | | |
|---|---|---|---|
| 188086 | 7/1986 | European Pat. Off. . | |
| 2340169 | 9/1977 | France . | |
| 2427636 | 12/1975 | Germany . | |
| 54-28261 | 3/1979 | Japan | 72/367 |
| 57-103741 | 6/1982 | Japan | 72/352 |
| 57-127535 | 8/1982 | Japan | 72/359 |
| 58-86938 | 5/1983 | Japan | 72/352 |
| 4-235203 | 8/1992 | Japan . | |
| 6-266341 | 8/1994 | Japan | 72/359 |
| 9103746 | 11/1991 | Spain . | |

OTHER PUBLICATIONS

Rationelle Entformung von Spritz 94 Bteilen mit Auswerf, –Normahen Kunststoff Berater Apr. 1986, pp. 27–29.

*Primary Examiner*—Carl J. Arbes
*Attorney, Agent, or Firm*—Michael J. Striker

[57] ABSTRACT

A method of making the ejector tubes which serve to guide the ejectors used in molds, for example those used in injection molding comprises a series of operating stages performed on a tube which is the starting point. The first stage is the cutting of a length of the tube to the desired length, with diameter oversizing to allow for subsequent truing. The second stage involves reducing the diameter at one of the end sections. The third stage consists of pretruing the outside, the fourth stage being machining the inside of the end section with total concentricity. The fifth stage involves induction treatment, and this is followed by the sixth stage which is the truing of the outside to obtain the desired outside diameter. In the seventh stage the inside diameter of section is trued, and then finally, in the eighth stage the front section is refaced, thus obtaining an ejector tube for moulds in general. Optionally, a butt may be formed on the rear end of the tube.

5 Claims, 1 Drawing Sheet

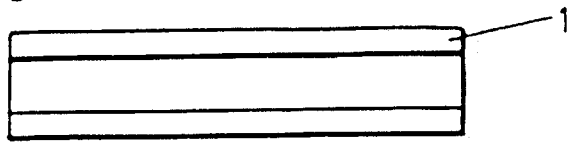
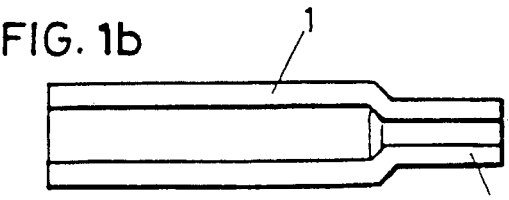
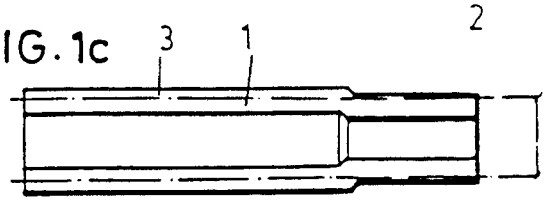
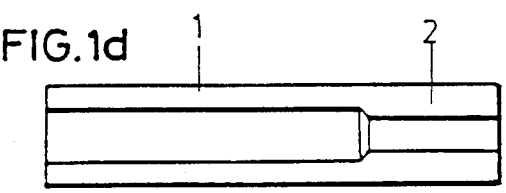
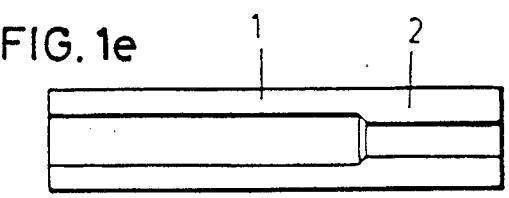
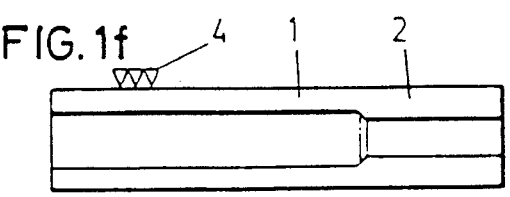
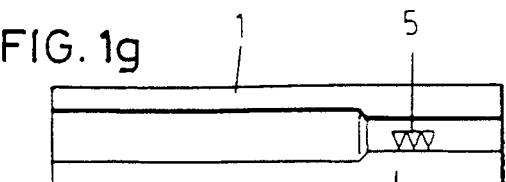
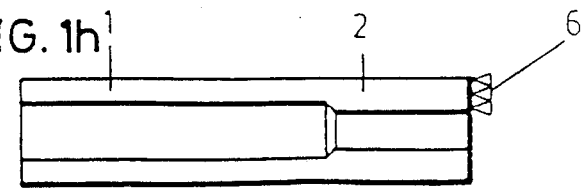
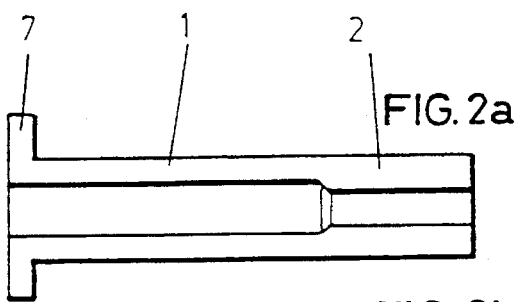
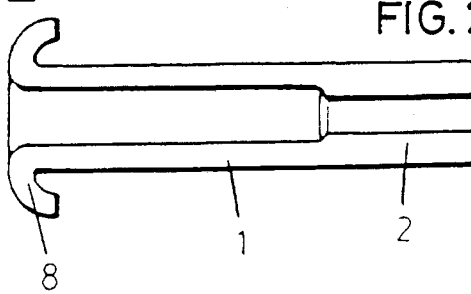

METHOD OF MAKING AN EJECTOR TUBE FOR MOLDS

BACKGROUND OF THE INVENTION

The present invention relates to a method of making an ejector tube for molds in general, though it is intended for application in particular with injection mold. The method is based on a series of stages of work carried out on a length of tubing of suitable length and diameter so as to achieve, through the minimum number of operations, the shaping of the ejector tube which serves as the guide for the ejectors used in molds, with both the ejector tube and the ejector being held in place by a fixing head.

The ejector tubes used as guides for ejectors linked to their fixing heads and included in injection moulds are conventionally produced from a bar or rod which is subjected to a series of processes: first, one of the ends is worked to produce the head, which is oversized with respect to the rest of the body; next, an axial bore is cut all the way through, and then suitably machined to give two diameters; it is then trued, and further operations are performed until the ejector tube sought is obtained.

The producing the ejector tube in the conventional manner, the starting point is a solid bar which, since its bore has to be drilled out, entails a loss of material, and furthermore this bar initially is very heavy. For example, to produce a standard ejector tube measuring 400 mm in length with a bore diameter of 8 mm and an outside diameter of 12 mm, the starting point is a bar of metal whose total weight is approximately 1,290 grams.

Furthermore, special machine tools are needed to produce it. As a consequence of all this, fourteen to sixteen different operations have to be performed—a long and laborious process.

It must also be borne in mind that, since material has to be removed to produce the bore, molecules will be broken, thereby reducing elasticity in the mechanical strength of the end product.

Another physical problem which cannot be eliminated arises during the heat treatment, since the various molecular masses which make up the product have varying thicknesses, and this makes the cooling stage in the hardening fragile, plastic deformations arising which require a special, additional truing process.

Finally, it must be pointed out that, in conventionally produced ejector tubes, when the tube has to be cut to length, the cut has to be made at the upper end, since naturally this operation is performed after attaching the piece to the appropriate fixing head. Since this area of the piece is the one in which the ejector and the tube itself are close-fitted, and since the cutting reduces the size of this area, that close-fit quality is lost.

SUMMARY OF THE INVENTION

The proposed method was designed to resolve these problems fully by starting from a length of tubing, which to begin with provides a considerable saving in weight, since to produce a tube of approximately the same size as the one referred to in the previous section, the weight involved in the procedure of this invention is approximately 220 grams, as against the 1,290 grams of the total weight of the piece which is the starting point for the conventional method.

Secondly, the ejector tube is designed to be correctly and effectively held by means of a fixing head which was claimed as a novelty in utility model 9103746 by the same applicant.

Among noteworthy advantages is the fact that no material has to be removed, and so no molecules are broken. Also the ejector tube is adjusted or cut at the lower end by virtue of its placing on the relevant fixing heads, and it can be removed from the top end of these, the lower close-fitted part being reduced.

In particular, the method of this invention, starting from a tube of suitable length and inside and outside diameters, comprises the following operational stages:

Cutting the length of tubing to the desired length, leaving some excess to allow for subsequent truing.

Reducing the diameter in one of the end sections of the tube, with a specific tolerance for performing the machining and achieving total concentricity.

Performing a pre-truing operation outside to approach the final truing.

Machining the inside of the deformed end, which will be the sliding end, to achieve the desired diameter minus the tolerance for the final truing, with total concentricity.

Carrying out induction hardening.

Truing to achieve a desired size in the outside diameter.

Truing to achieve the desired inside diameter.

Lapping the close-fit bore to achieve a final size, with optional nitriding.

In this way the tube is obtained, suitable for fitting to the existing ejector bases, providing quick changing in injection moulds.

In circumstances in which the molds do not require quick tube changing, or in the case of molds that are of less expensive design or produced in smaller batches, the procedure is to rivet on the back of the tube, finished as described above, a heat-formed butt onto the tube itself, by the stamping process. This operation is achieved by compressing onto the tube itself, re-heated by induction, on a predetermined circular structure and with a mold of the desired shape, on the basis of an impact procedure which may be interchangeable or fixed in accordance with the requirements of each case.

The inside diameter will in all cases be slightly smaller than the nominal diameter required, to eliminate the relieving operation necessary in working, in order to avoid the internal ejector rubbing along all its length, since a close-fit area is only needed in accordance with the friction areas required.

The ejector tube thus formed is obtained through a continuous process of heat treatment by induction, no deformations of any type arising. Not only is the product concerned improved, but the onerous task of truing required in the traditional systems is eliminated.

Moreover, the ejector tube will provide a number of advantages over conventional ones since, as is well known, conventional tubes are supplied in standard dimensions, each manufacturer having to adapt them to the specifications set. In every case the requirements of the product to be manufactured demand the length to be adjusted, and so the ejector tubes need to be shortened as required, which involves removing part of the friction zone, and this entails losses in the part and its friction, which significantly shortens the ejector tube's service life.

The ejector tube obtained through the procedure of this invention, being a tube throughout, gives the great advantage of allowing it to be cut at the rear end for the purpose of adapting it to the required size, so preserving in all cases the entire friction zone and thus lengthening the duration of that ejector tube.

Another important advantage lies in the fact that, in the event of a breakage or accident befalling the mould during the injection process, it is not necessary to remove the machine mold nor to disassemble the entire ejector unit in order to change the ejector tube, those being operations that are very time-consuming. It proves necessary to replace the ejector tube for any reason during the injection process, all that has to be done is to open the machine, to advance the ejector bridge until it presses against the press bushing and then to remove the damaged or defective ejector tube replacing it with another one and cutting off the excess length at the rear to the length required.

Furthermore, this ejector tube produced through the procedure described is very tough, since all the fibres have a single-direction molecular structure owing to having been shaped by the drawing process, and this gives higher tensile and compression strength.

BRIEF DESCRIPTION OF THE DRAWINGS

As a complement to the description given, and in order to assist understanding of the features of the invention, attached to this specification as an integral part hereof is a set of drawings showing, for illustrative purposes with no limitation entailed, the following:

FIGS. 1a, 1b, 1c, 1d, 1e, 1f, 1g and 1h show in consecutive order the various stages in producing the ejector tube in accordance with the procedure that is the subject of the invention.

FIGS. 2a and 2b show the possibility of including an intermediate stage, as will be described subsequently, to achieve a butt heat-formed on the tube itself as produced by the process shown in the previous figure.

DESCRIPTION OF PREFERENTIAL EMBODIMENT OF THE INVENTION

As can be seen in the figures referred to above, and with particular reference to FIG. 1a, it can be observed how the method of the invention takes as its starting point a length of tubing (1), cut in the method's first stage to the desired length, and with its inside and outside diameters slightly oversized. During the second stage, an end area (2) of the length of tubing (1) is submitted to external deformation, acting inwards, in order to reduce the inside diameter of this end length (2).

In the third stage, the body or length of tubing (1) is pre-trued at the area shown as (3), to make the outside diameter the same as the final or desired truing.

In the fourth stage, the length of tubing (1) is machined along the outside area or sliding area down to the desired diameter, with perfect concentricity.

Next the body (1) is induction treated, and then in the next stage it is trued as shown at (4), this truing being on the outside to obtain the final diameter desired.

In the next stage, internal truing is performed, as shown at (5), to achieve the inside diameter desired.

Finally, in the final stage the front is trued as shown at (6), and the tube is optionally subjected to nitriding, the tube thus being obtained as desired.

Between the seventh and eighth stages, i.e. between the last and the second-to-last stages, the tube (1) may be submitted to butting (7) by stamping to obtain the end form (8) shown in the second stage of this second figure.

It is not deemed necessary to prolong further this description since any expert in the subject will appreciate the scope of the invention and the advantages it brings.

The materials, shape, size and arrangements of the elements may all be altered provided such alteration does not affect the essence of the invention.

The terms in which this specification is expressed are to be taken in all cases in a broad, non-limiting sense.

I claim:

1. A method of making an ejector tube for molds, comprising the steps of cutting a starting tube to a desired length, with inside and outside diameters slightly oversized with respect to final inside and outside diameters; deforming one end area of the tube from an outside in to reduce the inside diameter of the one end area; pre-truing from the outside to bring the outside diameter of the tube to a desired value; machining an inside of the deformed one end area ensuring a total concentricity; treating the tube by induction; externally truing the tube to bring its outside diameter to a desired value; internally truing the one end area to obtain the inside diameter of desired value from the one end area; and truing a front end of the tube.

2. A method as defined in claim 1; and further comprising the step of nitriding the tube after the truing the front end.

3. A method as defined in claim 1; and further comprising the step of finally completely checking the tube after the truing of the front end.

4. A method as defined in claim 1; and further comprising the step of heat-forming a butt on a rear end of the tube between the steps of the internally truing of the diameter of the one end area and the truing of the front end of the tube.

5. A method as defined in claim 4, wherein said heat forming includes compressing with the tube heated by induction to obtain a preestablished circular shape by a mold of a corresponding shape.

* * * * *